US009981287B2

(12) United States Patent
Prouvost et al.

(10) Patent No.: US 9,981,287 B2
(45) Date of Patent: May 29, 2018

(54) LOW VOC, WATER-BASED COATING COMPOSITIONS SUITABLE FOR PROTECTING METAL CONTAINING SUBSTRATES INCLUDING FOOD AND BEVERAGE PACKAGES

(71) Applicant: Valspar Corporation, Minneapolis, MN (US)

(72) Inventors: Benoit Prouvost, En Breuille (FR); Marie Braillon Girard, Tournus (FR); Mark Stuetelberg, Cranberry Township, PA (US)

(73) Assignee: THE SHERWIN-WILLIAMS COMPANY, Cleveland, OH (US)

( * ) Notice: Subject to any disclaimer, the term of this patent is extended or adjusted under 35 U.S.C. 154(b) by 751 days.

(21) Appl. No.: 14/394,165

(22) PCT Filed: Mar. 13, 2013

(86) PCT No.: PCT/US2013/030892
§ 371 (c)(1),
(2) Date: Oct. 13, 2014

(87) PCT Pub. No.: WO2013/158261
PCT Pub. Date: Oct. 24, 2013

(65) Prior Publication Data
US 2015/0125642 A1 May 7, 2015

Related U.S. Application Data

(60) Provisional application No. 61/635,003, filed on Apr. 18, 2012.

(51) Int. Cl.
| | |
|---|---|
| B05D 7/20 | (2006.01) |
| B05D 7/22 | (2006.01) |
| C09D 5/00 | (2006.01) |
| C09D 5/02 | (2006.01) |
| C09D 5/08 | (2006.01) |
| C08F 220/14 | (2006.01) |
| C09D 133/12 | (2006.01) |
| B65D 25/14 | (2006.01) |
| C09D 133/08 | (2006.01) |
| B65D 85/84 | (2006.01) |
| C08L 75/04 | (2006.01) |

(52) U.S. Cl.
CPC ............. B05D 7/227 (2013.01); B05D 7/22 (2013.01); B65D 25/14 (2013.01); C08F 220/14 (2013.01); C09D 5/002 (2013.01); C09D 5/022 (2013.01); C09D 5/08 (2013.01); C09D 133/08 (2013.01); C09D 133/12 (2013.01); C08L 75/04 (2013.01); Y10T 428/1352 (2015.01); Y10T 428/1355 (2015.01)

(58) Field of Classification Search
CPC ..... B65D 25/14; C09D 133/08; C09D 133/12; B05D 7/22; B05D 7/227
USPC .............. 427/230–239; 428/34.1, 35.7
See application file for complete search history.

(56) References Cited

U.S. PATENT DOCUMENTS

| | | | |
|---|---|---|---|
| 5,464,885 A | 11/1995 | Craun | |
| 6,794,445 B2 | 9/2004 | Reusmann et al. | |
| 7,189,787 B2 | 3/2007 | O'Brien | |
| 7,439,292 B2 | 10/2008 | Destarac et al. | |
| 2003/0198819 A1* | 10/2003 | Reusmann | C08G 18/0823 428/447 |
| 2004/0259989 A1* | 12/2004 | O'Brien | C08J 3/05 524/236 |
| 2006/0141261 A1 | 6/2006 | Wind et al. | |
| 2008/0171195 A1 | 7/2008 | Gothlich et al. | |
| 2010/0178442 A1 | 7/2010 | O'Brien et al. | |
| 2011/0009540 A1 | 1/2011 | Terrenoire et al. | |
| 2012/0027974 A1* | 2/2012 | Skillman | C08G 63/553 428/35.8 |

FOREIGN PATENT DOCUMENTS

| | | |
|---|---|---|
| JP | 2005-146490 A | 6/2005 |
| WO | WO 2012/166488 | 12/2012 |

* cited by examiner

*Primary Examiner* — William P Fletcher, III
(74) *Attorney, Agent, or Firm* — Kagan Binder, PLLC

(57) ABSTRACT

Coating compositions and methods of using these compositions to form tough, abrasion resistant, and water resistant coatings on metal-containing substrates are described. Coating compositions are derived from one or more ingredients comprising at least one copolymer, referred to herein as Copolymer I, that preferably comprises (a) one or more repeating units (Repeating Unit(s) A) comprising at least one hydrophilic ester functionality and at least one polar functionality; and (b) one or more additional kinds of copolymerizable repeating units (Repeating Unit(s) B). Preferably, repeating Unit(s) A are a residue of an unsaturated monoester of a diacid or anhydride thereof having a carbon-carbon double bond, wherein at least one hydrophilic ester is pendant from a first carbon of the carbon-carbon double bond and at least on polar group is pendant from the second carbon of the carbon-carbon double bond. The monoester preferably is the reaction product of one or more water soluble or water dispersible alcohols with an unsaturated diacid or anhydride thereof.

17 Claims, No Drawings

LOW VOC, WATER-BASED COATING COMPOSITIONS SUITABLE FOR PROTECTING METAL CONTAINING SUBSTRATES INCLUDING FOOD AND BEVERAGE PACKAGES

PRIORITY

The present application claim priority to International Application No. PCT/US2013/030892, filed Mar. 13, 2013, which in turn claims priority under 35 USC § 119(e) from U.S. Provisional Patent Application having Ser. No. 61/635, 003, filed Apr. 18, 2012, entitled "LOW VOC, WATER-BASED COATING COMPOSITIONS SUITABLE FOR PROTECTING METAL CONTAINING SUBSTRATES INCLUDING FOOD AND BEVERAGE PACKAGES," wherein the disclosures of these applications are incorporated herein by reference in their respective entireties for all purposes.

FIELD OF THE INVENTION

The present invention relates to aqueous coating compositions incorporating one or more oligomers and/or polymers that are useful for protecting metal containing substrates such as food and beverage cans.

BACKGROUND OF THE INVENTION

A wide variety of coatings have been used to coat metal containing substrates such as the surfaces of packaging articles (e.g., cans) for food and beverages. For example, metal cans are sometimes coated using "coil coating" operations, i.e., a planar sheet of a suitable substrate (e.g., steel or aluminum metal) is coated with a suitable composition which is then cured. The coated substrate then is fabricated into the can end or body. Alternatively, coating compositions may be applied (e.g., by spraying, dipping, rolling, etc.) to all or a portion of can components and cured after the components already have been formed. Coatings are used both on the inside and outside of food and beverage cans. Coatings on the inside of the cans typically will directly contact the food or beverage that is packaged.

Packaging coatings should preferably be capable of high-speed application to the substrate and provide the necessary properties when cured to perform in this demanding end use. For example, the coating should be safe for food contact, have excellent adhesion to the substrate, and resist degradation over long periods of time, even when exposed to harsh environments.

Many coating compositions incorporate free radically polymerized, crosslinkable (meth)acrylic copolymers. In many instances, the copolymerization occurs in a relatively large amount of organic solvent to help provide low viscosity so that the copolymerization admixtures can be adequately stirred. Organic solvent also sometimes is used to help absorb the reaction exotherm. This increases the VOC (volatile organic content) content of the reaction admixture during manufacture. It would be desirable to reduce the VOC content of these reaction admixtures to make manufacture more environmentally friendly and to minimize the VOC of the final coating composition without practicing distillation or other technique to reduce the organic solvent content.

In some instances, coating compositions are provided in which copolymers are dispersed as suspended particles in aqueous media and/or organic solvents. Dispersions may have a tendency to prematurely dry on coating equipment. In alternative instances, coating compositions may be provided in which copolymers are dissolved in aqueous media and/or organic solvents. This avoids premature drying, and water-borne embodiments are typically low VOC.

A variety of strategies are used to synthesize copolymers that can be easily dispersed in aqueous media. One strategy incorporates a relatively large amount of (meth)acrylic acid content or the like to achieve a desired level of compatibility. Unfortunately, this can cause the Tg of the resultant copolymer to be unduly high. This can be a drawback, because this tends to increase viscosity and degrade flexibility. To lower the viscosity to a more suitable level, relatively large amounts of water and/or organic solvents may be added, but this increases the VOC and reduces NVC (nonvolatile content). Yet, if conventional strategies are used to keep the Tg at more acceptable levels, toughness and abrasion resistance tend to suffer. Strategies are desired that moderate the Tg and yet provide a high level of water compatibility without unduly sacrificing abrasion resistance and toughness.

Many current packaging coatings contain mobile or bound bisphenol A ("BPA") or aromatic glycidyl ether compounds or PVC compounds. Such chemistry is used for many reasons, including to promote adhesion between the resultant coating and the substrate, to provide a catalyst effect, to adjust flexibility, and/or the like. Although the balance of scientific evidence available to date indicates that the small trace amounts of these compounds that might be released from existing coatings do not pose any health risks to humans, these compounds are nevertheless perceived by some people as being potentially harmful to human health. Consequently, there is a desire by some to eliminate these compounds from food contact coatings. It will be appreciated that what is needed in the art is a packaging container (e.g., a food or beverage can) that shows strong adhesion to food and beverage packaging without relying on the BPA chemistry for adhesion.

SUMMARY OF THE INVENTION

The present invention provides coating compositions incorporating copolymers with hydrophilic and salt or salt forming groups, wherein at least some of the hydrophilic and salt/salt forming groups are preferably closely adjacent on the copolymer backbone. In preferred embodiments, the hydrophilic groups are hydrophilic ester groups. The coating compositions preferably are formulated so that a major portion of the copolymer is solubilized and a minor portion is dispersed as suspended particles. The copolymers preferably are highly compatible with water. This allows the coating compositions to be formulated as low VOC, water borne compositions. The coating compositions in many representative embodiments form tough, abrasion resistant, protective films on metal containing substrates.

The resultant cured coatings also are highly resistant to water, including exposure to water via immersion, humidity, condensation, or the like. Additionally, preferred embodiments may be formulated from constituents so that the coating compositions and resultant coatings are useful as protective coatings on the outside of metal containing food and beverage packaging, such as cans. Preferred embodiments show very strong adhesion to food and beverage packages without having to use adhesion promoting technologies that rely on bisphenol A chemistry to achieve adhesion.

Without wishing to be bound by theory, it is believed that the solubilized/dispersed character of the copolymers contributes to favorable drying properties that minimize the risk of premature drying on or in coating equipment. This makes the coating compositions compatible with a wide range of coating techniques, particularly roll coating techniques where conventional waterborne acrylic compositions have been vulnerable to premature drying problems.

The copolymers may be fabricated using reactants that can function as reactive diluents for the copolymerization reaction. This minimizes the need for copolymerization solvents, allowing the fabrication mixtures to be low VOC as well as the resultant coating compositions. Also, the reactive diluents help absorb the reaction exotherm to further minimize the need for solvents and thereby further promote low VOC characteristics. The reaction also proceeds relatively quickly with high conversion of reactants and high yield of the desired product. Optionally, therefore, the reaction admixture can be used directly to formulate the coating compositions without work up, isolation, or purification of the copolymer, if desired.

Typical volatile organic compounds have relatively high vapor pressures at ordinary, room-temperature conditions. Their high vapor pressures generally results from a low boiling point at 1 atm of pressure, typically below 100° C., often below 80° C. and even below 50° C. The relatively low boiling point which causes large numbers of molecules to evaporate or sublimate from the liquid or solid form of the compound and enter the surrounding air. VOCs can be solids, liquids, or gases at room temperature. Many have a vapor pressure at 25° C. equal to or greater than 0.1 mmHg. VOC content refers to the weight of VOC per unit volume or per unit weight of a composition.

VOC content can be expressed as weight of VOC materials including solvent(s) if any per unit volume of solids, i.e., non-solvent constituents, of the composition. An exemplary VOC content is expressed as kg VOC per liter solids. Preferred coating compositions and/or manufacturing compositions of the present invention have a VOC content of no greater than 0.4 kg VOC/liter solids, more preferably no greater than 0.2 kg VOC/liter solids, even more preferably no greater than 0.1 kg VOC/liter solids.

Volatile organic compounds generally comprise at least one carbon and/or nitrogen, provided however that VOCs do not include oxides of nitrogen or carbon or ammonium salts of nitrogen or carbon oxides. Thus, none of water, carbon dioxide, nitrous oxide, carbon monoxide or ammonium carbonate is a VOC. However, ammonia, hydrocarbyls, alcohols, ethers, or the like having sufficiently low boiling points would be VOCs.

The copolymers can be incorporated into coating compositions that contain relatively large amounts of water. This not only contributes to low VOC characteristics of the coating and copolymerization compositions, but also allows the coating and copolymerization compositions to have low viscosity. This makes the coating and copolymerization compositions easy to handle and apply.

As still yet another advantage, the copolymers in some preferred embodiments can be formed from synthesis strategies that provide the copolymer with a high degree of abrasion resistance, toughness and water compatibility and suitable flexibility with moderate Tg characteristics that are not unduly high. This is particularly advantageous, as many conventional formulation strategies must balance water compatibility, abrasion resistance, and toughness against Tg.

In one aspect, the present invention relates to a method of making a coated, food and/or beverage container or portion thereof, said method comprising the steps of:
a) providing a coating composition derived from one or more ingredients comprising at least one copolymer that comprises a repeating unit of the formula:

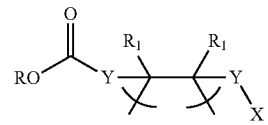

wherein:
i) R is a hydrophilic moiety that has a molecular weight of at least 59 g/mol and optionally may form a cyclic group with other moieties of the repeating unit or of the copolymer; and
ii) each R1 independently is H, a co-member of a ring structure, or a monovalent aromatic and/or aliphatic moiety;
iii) each Y independently is a single bond (e.g., the carbon of the depicted carbonyl is attached directly to the adjacent carbon to which $R^1$ is attached and/or X is attached directly to the adjacent carbon to which $R^1$ is attached), a co-member of a ring structure, or a divalent linking group; and
iv) X is a salt or a salt forming group; and
b) causing the coating composition to be used to form a coated, metal containing food and/or beverage container or portion thereof.

In another aspect, the present invention relates to a method of making a coated, food and/or beverage container or portion thereof, said method comprising the steps of:
a) providing a coating composition derived from one or more ingredients comprising at least one copolymer, at least one crosslinking resin comprising functionality that is co-reactive with at least one other functionality on another ingredient of the coating composition, and at least one additional resin having phosphonate functionality, wherein the copolymer comprises repeating units of the formula:

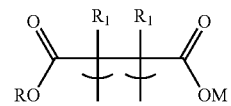

wherein:
i) each $R_1$ independently is H, a co-member of a ring structure, or a monovalent aromatic and/or aliphatic moiety
ii) R is a hydrophilic moiety that has a molecular weight of at least 59 g/mol and optionally may form a cyclic group with other moieties of the repeating unit or of the copolymer;
iii) M comprises H, ammonium, substituted ammonium (e.g., substituted ammonium derived from primary, secondary, and/or tertiary amines), a metal cation, and combinations of these;
b) causing the coating composition to be used to form a coated, metal containing food and/or beverage container or portion thereof.

As used herein, a substituted ammonium functionality refers to a cation functionality comprising nitrogen attached to four substituents, wherein up to 3 of the substituents, preferably 1-2, more preferably 0 of the substituents is H.

In another aspect, the present invention relates to a coated food and/or beverage container or portion thereof comprising a metal substrate and a coating provided on the substrate, wherein the coating is derived from one or more ingredients comprising at least one copolymer that comprises a repeating unit of the formula:

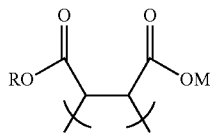

wherein:
i) R is a hydrophilic moiety that has a number average molecular weight of at least 59 g/mol and an average ratio of C atoms to heteroatoms of 3.2 or less and optionally may form a cyclic group with other moieties of the repeating unit or of the copolymer; and
ii) M comprises H, ammonium, substituted ammonium (e.g, substituted ammonium derived from primary, secondary, and/or tertiary amines), a metal cation, and combinations of these.

In another aspect, the present invention relates to a method of making a coated, food and/or beverage container or portion thereof, said method comprising the steps of:
a) providing a free radically polymerizable monoester obtained by reacting at least one water soluble and/or water dispersible alcohol with maleic anhydride;
b) copolymerizing the monoester with one or more free radically copolymerizable reactants to form a copolymer under conditions such that the monoester is a reactive diluent for the copolymerizing; and
c) preparing an aqueous coating composition comprising the copolymer and at least one crosslinking resin comprising a functionality that is co-reactive with a functionality on the copolymer; and
d) causing the aqueous coating composition to be used to form a coated, metal containing food and/or beverage container or portion thereof.

In another aspect, the present invention relates to a method of making a coated, food and/or beverage container or portion thereof, said method comprising the steps of:
a) providing a coating composition derived from one or more ingredients comprising at least one copolymer that comprises a at least one unit of the formula:

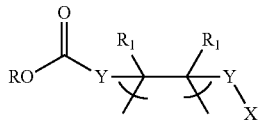

wherein:
iv) R is a hydrophilic moiety that has a molecular weight of at least 59 g/mol and optionally may form a cyclic group with other moieties of the repeating unit or of the copolymer; and
v) each $R_1$ independently is H, a co-member of a ring structure, or a monovalent aromatic and/or aliphatic moiety;
vi) each Y independently is a single bond (e.g., the carbon of the depicted carbonyl is attached directly to the adjacent carbon to which $R^1$ is attached and/or X is attached directly to the adjacent carbon to which $R^1$ is attached) and, co-member of a ring structure, or a divalent linking group; and
vii) X is a salt or a salt forming group; and
b) causing the coating composition to be used to form a coated, metal containing food and/or beverage container or portion thereof.

In many embodiments, the two available bonds on the structures above (shown by the bonds extending through the parentheses) independently can bond to other repeating units that may be the same or different and/or to terminal groups.

DETAILED DESCRIPTION OF PRESENTLY PREFERRED EMBODIMENTS

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

The present invention provides coating compositions and methods of using these compositions to form tough, abrasion resistant, and water resistant coatings on metal-containing substrates. Coating compositions of the present invention are derived from one or more ingredients comprising at least one copolymer, referred to herein as Copolymer I, that preferably comprises (a) one or more repeating units (Repeating Unit(s) A) comprising at least one hydrophilic ester functionality and at least one polar functionality; and (b) one or more additional kinds of copolymerizable repeating units (Repeating Unit(s) B). Preferably, repeating Unit(s) A are a residue of an unsaturated monoester of a diacid or anhydride thereof having a carbon-carbon double bond, wherein at least one hydrophilic ester containing group is pendant from a first carbon of the carbon-carbon double bond and at least one polar group is pendant from the second carbon of the carbon-carbon double bond. The monoester preferably is the reaction product of one or more water soluble or water dispersible alcohols with an unsaturated diacid or anhydride thereof.

The relative amounts of Repeating Unit(s) A and B incorporated into Copolymer I may vary over a wide range. Generally, Repeating Unit(s) A contribute to abrasion resistance and toughness of the resultant coatings as well as the dispersability and/or solubility of Copolymer I in aqueous media or polar organic solvents of the resultant coating compositions. Accordingly, a sufficient amount of Repeating Unit(s) A preferably are included to contribute in a desired manner to these objectives. On the other hand, more preferred embodiments of Repeating Unit(s) A (described below) are resistant to homopolymerization under more desired copolymerization conditions. Consequently, it is desirable to incorporate a sufficient amount of Repeating Unit(s) B into Copolymer I to facilitate copolymerization and incorporation of Repeating Unit(s) A into the growing copolymer. In addition to using Repeating Unit(s) B to facilitate copolymerization, one or more additional kinds of Repeating Unit(s) B can be incorporated into Copolymer I to provide Copolymer I, coating compositions, and/or resultant coatings with desired characteristics. Examples of these characteristics include providing additional polar functionality, promoting hardness, providing crosslinking or grafting functionality, modulating Tg (Tg refers to the glass transition temperature of a resin material and may be determined using differential scanning calorimetry or other suitable techniques) of the resultant Copolymer I, enhancing stability, modulating viscosity, compatibility and/or the like. In many illustrative embodiments, therefore, Copolymer I includes from 0.1 to 50 parts by weight, more preferably 2 to 20 parts by weight of Repeating Unit(s) A per 50 to 100 parts by weight of Repeating Unit(s) B.

Coating compositions of the present invention may include a combination of more than one Copolymer I. Embodiments of Copolymer I may be present as random or block copolymers. Random copolymers are preferred.

Copolymer I may be selected from one or more different polymer types. Examples include polyurethane, polyether, polyester, polycarbonate, (meth)acrylic copolymers, polyamides, polyimides, polyolefins, combinations or copolymers of any of these, and the like. Even though Copolymer I may be based upon one or more different kinds of polymer types, (meth)acrylic copoloymers are preferred based on balancing factors such as ease of manufacture, cost, abrasion resistance, toughness, durability, Tg characteristics, compatibility, ease of solubilizing or dispersing, and the like. A (meth)acrylic copolymer is a copolymer that is the reaction product of two or more free radically copolymerizable reactants. (Meth)acrylic copolymers are also known by other names, including vinyl copolymers, acrylic copolymers, (meth)acrylate copolymers, free radically polymerized copolymers, and the like.

Free radical polymerization is a method of polymerization by which a polymer forms by the successive addition of free radical building blocks. Free radicals can be formed via a number of different mechanisms usually involving separate initiator molecules. Following its generation, the initiating free radical adds repeating units, thereby growing the polymer chain.

Illustrative embodiments of Copolymer I may have number average molecular weights over a wide range. If the molecular weight is too high, however, the reaction admixtures used to make the copolymer and/or resultant coating compositions may be too viscous for optimum handling. On the other hand, if the molecular weight is too low, resultant coatings may lack desired performance characteristics such as flexibility, toughness, resilience, abrasion resistance, and/or the like. As general guidelines, number average molecular weights of Copolymer(s) I are in the range from 1,000 to 50,000, preferably 2,000 to 20,000, more preferably 2,000 to 8,000, even more preferably 4,000 to 8,000. As used herein, the term molecular weight refers to the number average molecular weight unless otherwise noted.

In many instances, a material such as Copolymer I may be present as a population distribution in which the actual molecular weight of individual molecules varies within the population. The number average molecular weight provides a statistical way to describe the molecular weight of the population as a weighted average of the actual molecular weights of individual molecules. In other instances, such as for smaller alcohols (described below), the material might be present predominantly in a single molecular form (e.g., ethyldiglycol may be present predominantly as

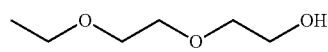

having a molar mass of 134.17 g/mol rather than as a population distribution of different molecules of different sizes. In such instances, the actual molecular weight of individual molecules is substantially identical among the population so that the atomic weight and the number average molecular weight of the population are the same. Hence, the number average molecular weight of ethyldiglcyol also is 134.17.

Molecular weight parameters may be determined using any suitable procedures. According to one approach, molecular weight features can be determined via liquid or gas chromatography with mass detector.

Illustrative hydrophilic ester functionality generally may be represented by a moiety of the formula

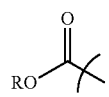

In many instances, this structure results from the reaction of water soluble and/or water dispersible alcohol(s) that are monofunctional with respect to OH with a co-reactive carboxylic acid or anhydride functionality effective to form the ester functionality. Even if obtained via a different synthesis that results in the same kind of structure, the structure obtained from a different synthesis pathway still may be deemed to result from the reaction between such alcohols and co-reactive acid or anhydride functionality. The water soluble and/or water dispersible alcohols preferably have a molecular weight of at least 59, more preferably at least 100, or even at least about 200 so that the R functionality of the resultant ester group provides a dispersing effect to help improve compatibility of Copolymer I with aqueous media or polar organic solvents. Desirably, however, the molecular weight of the alcohol is less than 3,000, preferably less than 2,000, and even less than 1,000 so that the viscosity characteristics of the reaction admixture used to form Copolymer I as well as the resulting coating composition are not unduly high. R preferably includes one or more heteroatoms with oxygen being a preferred heteroatom. In illustrative embodiments, R is a monovalent moiety comprising at least 4 carbon atoms and at least 1 oxygen atom such that the ratio of carbon atoms to oxygen atoms in the entire ROH molecule is preferably 3.5:1 or less; more preferably 3:1 or less, even more preferably 2.5:1 or less or even 2.2:1 or less. Optionally, other kinds of linkages may also be present in R, including by way of example, urethane, amide, imide, urea, carbonate, epoxy, ether, ester, combinations of these, and the like.

The water soluble and/or water dispersible alcohols may include primary, secondary, and/or tertiary OH functionality. Primary OH functionality is preferred. Desirably, the alcohols are monofunctional with respect to OH to minimize side reactions during formation of Copolymer I. Additional OH functionality may be masked if desired so that the masked alcohol functions as a monofunctional alcohol during copolymerization. After copolymerization, the masking can be removed to restore the OH functionality.

Exemplary water soluble and/or water dispersible alcohols have the formula ROH, wherein R is as defined above. Exemplary water soluble alcohols include butylglycol, ethyldiglycol, methoxy propylene glycol, polyalkylene glycols, combinations of these, and the like.

Exemplary co-reactive functionalities that can react with the alcohols to form ester functionality include carboxylic acid, anhydrides of carboxylic acids, and/or the like acid chlorides or transesterification. Preferred co-reactive materials suitable in the practice of the present invention include materials comprising free radically polymerizable functionality and at least two acid groups or one or more cyclic anhydrides thereof.

One class of exemplary unsaturated diacids (or anhydrides thereof) useful in the practice of the present invention may have the formula

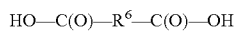

HO—C(O)—R$^6$—C(O)—OH or

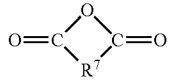

wherein each of R$^6$ and R$^7$ is independently a divalent moiety comprising free radically polymerizable functionality in which the free radically polymerizable functionality may be in the backbone and/or in a moiety pendant from the backbone. After Copolymer I is formed, all or a portion of the acidic —COOH functionality may be neutralized to form —COOM moieties, wherein each M is independently H or a cation such as Na+, K+, Li+, NH$_4$+ (ammonium), substituted ammonium including quaternary ammonium, combinations of these, and/or the like. R$^6$ and R$^7$ independently may be linear, branched, or part of a spiro, cyclic, polycyclic, or fused cyclic structure.

Exemplary embodiments of R$^6$ or R$^7$ in which the free radically polymerizable unsaturation is a carbon-carbon double bond that is part of the backbone may have the cis or trans structure

—X$^3$—C(R$^9$)=C(R$^{10}$)—X$^4$— wherein each of X$^3$ and X$^4$ is independently a single bond (i.e., X$^3$ or X$^4$ does not include any atoms) or a divalent organic groups such as, e.g., a substituted or unsubstituted hydrocarbyl moiety that may be a co-member of a ring structure and may include 1 to 20, preferably 1 to 10, more preferably 1 to 5 carbon atoms such as —CH$_2$—, —CH$_2$CH$_2$—, combinations of these, and the like; and each of R$^9$ and R$^{10}$ is independently H or a pendant nonpolar or polar moiety including from 1 to 50, preferably 1 to 20, more preferably 1 to 10 carbon atoms. R$^9$ and R$^{10}$ may also be co-members of a ring structure.

Particularly preferred unsaturated diacids (or anhydrides thereof or any stereoisomer(s) thereof) useful in the practice of the present invention may be represented by one or more of the formulae

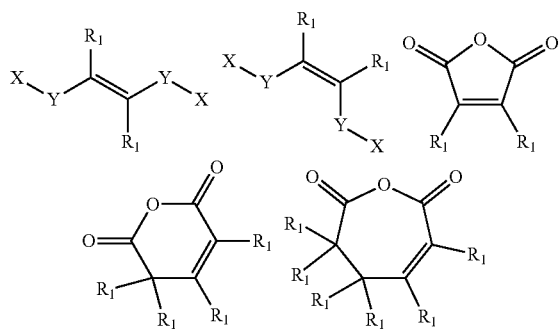

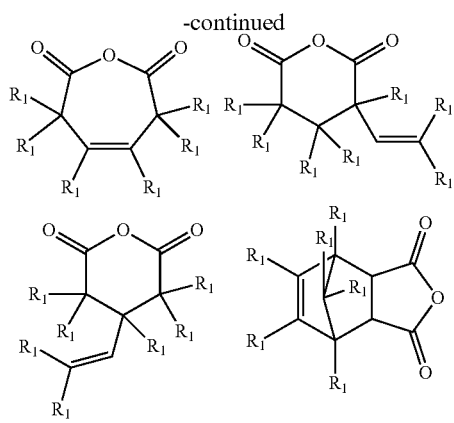

wherein each X is a monovalent moiety or co-member of a ring structure such as with another X, and each X comprises —COOH or anhydride thereof; each Y independently is a single bond or a divalent linking group preferably a divalent linking group comprising at least one O and/or 1 to 8, more preferably 1 to 3, even more preferably 1 carbon atom(s); and each R$_1$ is hydrogen, a co-member of a ring structure, or a monovalent aromatic and/or aliphatic moiety of 1 to 15, preferably 1 to 5, more preferably 1 to 2 carbon atoms that optionally may include one or more heteroatoms. All or a portion of the acidic —COOH functionality may be neutralized to form —COOM moieties, wherein each M is independently a cation such as Na+, K+, Li+, NH$_4$+ (ammonium), substituted ammonium including quaternary ammonium and/or substituted ammonium with 1-3 H substituents, another monovalent moiety, combinations of these, and/or the like. Desirably, neutralization may occur after Copolymer I is formed.

Exemplary unsaturated diacids (or anhydrides thereof or any stereoisomer(s) thereof) suitable in the practice of the present invention that comprise free radically polymerizable functionality and at least two acid groups or one or more anhydrides thereof are selected from maleic acid, fumaric acid, maleic anhydride, 4-cyclohexene-1,2-dicarboxylic acid or anhydride, itaconic acid, nadic anhydride, methyl nadic anhydride, combinations of these and the like.

Maleic anhydride is preferred. This monomer and its mono esters tend to be resistant to homopolymerization and tend to be progressively incorporated into the growing copolymer as the copolymerization proceeds. Thus, maleic anhydride monoesters and similar materials can be used as a reactive diluent in copolymerization admixtures. Advantageously, this reduces the amount of solvent needed to carry out polymerization. Maleic anhydride monoesters and similar materials also can co-polymerize in a manner that yields a copolymer product having desired low polydispersity without necessarily having to resort to substantial purification techniques to isolate the narrow polydisperse product range that might be desired. Additionally, maleic anhydride monoesters and similar materials react relatively quickly with copolymerizable reactants at relatively low temperature in the present context, and by-products are minimal. Thus, both conversion of reactants and yield of products are high.

Preferred embodiments of Copolymer I are obtained by free radical copolymerization of one or more Repeating Unit(s) A and one or more Repeating Unit(s) B, wherein one or more Repeating Unit(s) A are derived from an unsaturated monoester that is the reaction product of a water soluble and/or water dispersible alcohol(s) and one or more materials that include free radically polymerizable functionality and at least two acid groups or anhydrides thereof. Illustrative embodiments of Copolymer I formed in this way comprise Repeating Unit(s) A of one or more of the following formulae:

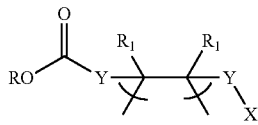

wherein R, Y, X, and $R_1$ are as defined above. More preferred embodiments of Repeating Unit(s) A have the following formula after all or a portion of acidic functionality is neutralized:

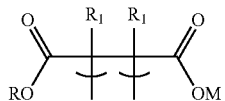

wherein R, R1, and M are as defined above and Y is a single bond.

Repeating Unit(s) B and can be derived from a wide variety of materials that are copolymerizable with Repeating Unit(s) A. In more preferred modes of practice in which Repeating Unit(s) A comprise at least one free radically polymerizable moiety, Repeating Unit(s) B are derived from one or more materials that comprise one or more free radically co-polymerizable materials as well. Repeating Unit(s) B may be derived from monomers, oligomers or polymer reactants. As used herein, a monomer refers to a reactant that incorporates a single repeating unit derived from a precursor having polymerizable functionality. An oligomer refers to a reactant that incorporates 2 to 10 repeating units that may be the same or different, including end capping units. A polymer refers to a reactant that incorporates more than 10 repeating units including end capping units.

The one or more free radically polymerizable materials in forming Repeating Unit(s) B preferably comprise free radically polymerizable monomers with molecular weights below about 800, preferably below about 500. The amount of such monomers to be incorporated into Repeating Unit(s) B can vary within a wide range. As general guidelines, from about 25 to about 100, preferably 80 to 100 weight percent of the reactants corresponding to Repeating Unit(s) B are monomers having a molecular weight below about 800, preferably below about 500 based on the total weight of the reactants used to provide Repeating Unit(s) B. The reactants in forming Repeating Unit(s) B may be hydrophilic and/or hydrophobic.

Suitable free radically copolymerizable reactants suitable for use in forming all or a portion of Repeating Unit(s) B may include one or more alkyl(meth)acrylates, other free radically polymerizable monomers, and the like. Suitable alkyl(meth)acrylates may be substituted or unsubstituted and include those having the structure:

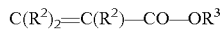

wherein each $R^2$ independently is hydrogen or methyl, and $R^3$ is H or an alkyl group preferably containing one to sixteen carbon atoms and optionally 1 or more heteroatoms such as O, S, P, and/or N. The $R^3$ group can be substituted with one or more, and typically 0 to three, moieties such as hydroxy, halo, phenyl, acid, sulfonate, phosphonate, oxirane, and alkoxy, for example. The alkyl(meth)acrylate typically is an ester of acrylic or methacrylic acid. Preferably, $R^2$ is hydrogen or methyl and $R^3$ is an alkyl group having two to eight carbon atoms. Most preferably, $R^2$ is hydrogen or methyl and $R^3$ is an alkyl group having two to four carbon atoms.

Examples of suitable alkyl(meth)acrylates include, but are not limited to, methyl (meth)acrylate, ethyl (meth)acrylate, propyl(meth)acrylate, isopropyl(meth)acrylate, butyl (meth)acrylate, isobutyl (meth)acrylate, pentyl(meth)acrylate, iso-amyl(meth)acrylate, hexyl(meth)acrylate, 2-ethylhexyl (meth)acrylate, cyclohexyl(meth)acrylate, decyl(meth)acrylate, isodecyl(meth)acrylate, benzyl (meth)acrylate, lauryl(meth)acrylate, isobornyl(meth)acrylate, octyl(meth)acrylate, 1-hydroxyethyl (meth)acrylate, 2-hydroxyethyl (meth)acrylate, (meth)acrylic acid, alpha-chloroacrylic acid, alpha-cyanoacrylic acid, beta-methylacrylic acid (crotonic acid), alpha-phenylacrylic acid, beta-acryloxypropionic acid, sorbic acid, alpha-chlorosorbic acid, angelic acid, cinnamic acid, p-chlorocinnamic acid, beta-stearylacrylic acid, itaconic acid, citraconic acid, mesaconic acid, glutaconic acid, aconitic acid, tricarboxyethylene, glycidyl (meth)acrylate, mono- and di-glycidyl itaconate, mono- and di-glycidyl maleate, and mono- and di-glycidyl formate, octyl(meth)acrylate, iso-octyl(meth)acrylate, nonylphenol ethoxylate(meth)acrylate, isononyl(meth)acrylate, diethylene glycol(meth)acrylate, 2-(2-ethoxyethoxy)ethyl (meth)acrylate, 2-ethylhexyl(meth)acrylate, lauryl(meth)acrylate, butanediol mono(meth)acrylate, beta-carboxyethyl (meth)acrylate, dodecyl(meth)acrylate, stearyl(meth)acrylate, hydroxy functional polycaprolactone ester (meth)acrylate, hydroxymethyl (meth)acrylate, hydroxypropyl(meth)acrylate, hydroxyisopropyl(meth)acrylate, hydroxybutyl (meth)acrylate, hydroxyisobutyl (meth)acrylate, tetrahydrofurfuryl (meth)acrylate, ethylene urea ethyl (meth)acrylate, 2-sulfoethylene(meth)acrylate, nonyl(meth)acrylate, combinations of these and the like.

Additional examples of free radically polymerizable monomers include styrene, substituted styrene such as methyl styrene, halo styrene, isoprene, diallylphthalate, divinylbenzene, conjugated butadiene, alpha-methylstyrene, vinyl toluene, vinyl naphthalene, N-vinyl-2-pyrrolidone, (meth)acrylamide, (meth)acrylonitrile, acrylamide, vinyl acetate, vinyl propionate, vinyl butyrate, vinyl stearate, isobutoxymethyl (meth)acrylamide, N-substituted (meth)acrylamide, urea ethyl (meth)acrylamide, vinylsulfonic acid, vinylbenzenesulfonic acid, α-(meth)acrylamidomethyl-propanesulfonic acid, vinyl phosphonic acid and/or its ester and mixtures thereof. In some embodiments, the free radically polymerizable monomers, resultant polymers, coating compositions of the present invention, and/or coatings of the present invention are substantially free of aromatic monomers, oligomers incorporating such monomers, and/or polymers incorporating such monomers.

A particularly preferred embodiment of Repeating Units B are derived from reactants that comprise (1) from 10 to 300 parts by weight of a substituted or unsubstitued, aromatic, free radically polymerizable monomer such as styrene or alpha methyl styrene; (2) from 20 to 1000 parts by weight of at least one C1 to C3 alkyl(meth)acrylate that preferably is methyl (meth)acrylate; (3) from 10 to 200 parts by weight of at least one hydroxyl functional free radically polymerizable monomer that preferably is a hydroxyl substituted (meth)acrylate; and (4) from 5 to 200 parts by weight of at least one polar group functional, water soluble free radically polymerizable monomer that preferably is an acid functional (meth)acrylate; wherein the recited parts by weight of these Repeating Unit B constituents are per 100 to 500 parts by weight of the total amount of Repeating Unit(s) A. Optionally, all or a portion of the acid functionality (if any) of the resultant Copolymer I is neutralized with a suitable base, more preferably an amine or alkanol amine (e.g., a secondary or tertiary amine). This is advantageous to improve the water compatibility.

Copolymer I may be made in a variety of ways. According to an illustrative mode of practice, Copolymer I is made by a synthesis strategy including at least two stages. In a first stage, a free radically polymerizable ester is provided including free radically polymerizable functionality, hydrophilic functionality (preferably hydrophilic ester functionality) and at least one polar functionality. Preferably, the hydrophilic ester and polar functionalities are incorporated into a residue of an unsaturated monoester of a diacid or anhydride thereof having a carbon-carbon double bond, wherein at least one hydrophilic ester-containing group is pendant from a first carbon of the carbon-carbon double bond and at least one polar group is pendant from the second carbon of the carbon-carbon double bond. The monoester preferably is the reaction product of one or more water soluble or water dispersible alcohols with an unsaturated diacid or anhydride thereof.

Preferred embodiments of free radically polymerizable esters for use in forming Repeating Unit(s) A have one or more of the following formulae or any stereoisomer thereof:

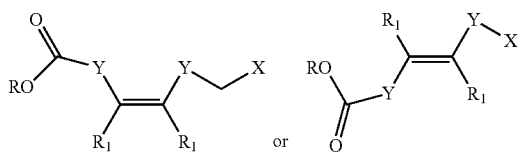

wherein R, X, Y, and R1 independently are as defined above. Particularly preferred embodiments of the free radically polymerizable ester have one or more of the following formulae or any stereoisomer thereof:

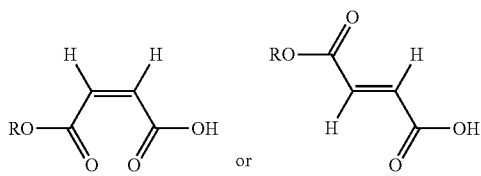

wherein R is as defined above.

In preferred modes of practice, the free radically polymerizable ester is the reaction product of a water soluble alcohol as described above and an unsaturated polyfunctional acid (or anhydride thereof) as described above. The reaction is carried out to favor formation of the monoester. One or more strategies may be used singly or in combination to favor monoester formation. First, the reaction may be carried out at a moderate temperature. If the temperature is too high, undue amounts of diester may be formed. If the temperature is too low, the formation of the monoester may proceed too slowly. Balancing such concerns, the reaction desirably occurs at a temperature in the range from 50° C. to 175° C., more desirably 135° C. to 150° C. Second, the reaction may be carried out without ester catalyst or in the presence of a catalyst that is only moderately active for ester formation. Preferably, no ester catalyst is used to maximize monoester yield. Third, as the reaction proceeds, by-product water is formed. Monoester formation is favored by allowing the reaction to proceed without removing the water from the reaction admixture or by removing only a relatively minor amount of the water. In contrast, removing substantially all of the water as the reaction proceeds tends to increase the amount of diester that forms.

Providing a free radically polymerizable monoester rather than a diester is believed to provide many advantages. First, the resultant free radically polymerizable monoester includes both hydrophilic ester and polar group functionality. This allows the monoester to serve as a source of at least a portion of the polar group functionality incorporated into Copolymer I. This way of introducing carboxylic acid functionality has a lower impact on Tg than does introducing such functionality by using (meth)acrylic acid, which may tend to cause Tg to be too high. A higher Tg may be undesirable as a higher Tg may cause viscosity of coating admixtures to be higher than desired. Resultant coatings may lack a desired degree of flexibility as well.

Second, the monster is resistant to homopolymerization and, consequently, is progressively incorporated into the copolymer over time as copolymerization with the other copolymerization reactants proceeds. This allows the ester to function as a reactive diluent. This keeps viscosity low while minimizing the need for additional solvent. To the extent solvent is needed, excess water soluble alcohol can be used so that the solvent and alcohol reactant are the same. The reactants thus can act as a heat sink to accommodate the reaction exotherm. This favors mono ester formation by helping to keep the reaction temperature from getting too high.

Further, it is believed that the hydrophilic characteristics resulting from both the water soluble alcohol and other polar group functionality enhance the compatibility of Copolymer 1 with aqueous media. In preferred embodiments respective portions of Copolymer 1 are both solubilized and dispersed in resultant coating compositions, Advantageously, this dramatically reduces the tendency of the coating composition to dry prematurely on coating equipment but still preserves excellent coating properties for forming smooth, high quality protective films.

Further, the monoester helps to control and limit the number average molecular weight of Copolymer I. This helps to keep viscosity low at the polymerization stage, the formulating stage, and/or the using stage. Consequently, coating compositions can be coated onto wide ranges of metal substrates using a wide range of coating techniques.

Desirably, the reaction between the water soluble and/or water dispersible alcohol(s) and the unsaturated polyfunctional acid(s) (or anhydride thereof) occurs with the alcohol in stoichiometric excess. This allows the alcohol to function both as reactant and diluent. In illustrative modes of practice, the molar ratio of water soluble alcohol to the polyfunctional acid (or salt or anhydride thereof) is in the range from 1.5:1 to 10:1, preferably 3:1 to 6:1.

The reaction desirably occurs under a protected atmosphere to isolate the reactants from oxygen, humidity, and contamination. An exemplary protected atmosphere includes nitrogen, carbon dioxide, argon, combinations of these, and the like.

The reaction may occur at a wide range of pressures, including ambient and elevated pressures. Ambient pressure is suitable and economical.

The reaction is allowed to proceed to a desired stage of completion. According to one approach, the reaction progress can be monitored by evaluating one or more characteristics of the reaction admixture that are a function of the reaction progress. For instance, acid value can be monitored and the reaction can be deemed to be complete when the acid value is stable.

Optionally, one or more additional solvents can be added to the reaction mixture if desired. Exemplary solvents include water and/or organic polar solvents. Except for the addition of excess water soluble alcohol, it has been found that adding additional solvent often is not needed in the stage of forming the monoester.

In a second stage of reaction, the resultant monoester is copolymerized with the one or more Repeating Unit B reactants. Desirably, the second stage may occur in the same reaction vessel, and the protected atmosphere is maintained. These additional reactant(s) can be added to the reaction admixture all at once or progressively as the reaction proceeds. It is more desirable to add the reactants continuously or in batches over time. Such progressive addition helps to control the copolymerization exotherm.

If more than one additional reactant is used, these may be added sequentially or in admixture. Adding the reactants in admixture facilitates formation of a random copolymer.

The copolymerization may occur at a wide range of temperatures. If the temperature is too low, the reaction may proceed too slowly. If the temperature is too high, it is possible that some functionality may unduly react with other functionality. For instance, hydroxyl functionality (if any) may form esters with acid functionality. Although such ester formation may be desirable after the coating is applied to a substrate and allowed or caused to cure, such reactions are generally undesirable during the formation of Copolymer I or the formation of coating compositions, as the reaction admixture or coating composition may become too thick. Balancing such concerns, the copolymerization desirably occurs at a temperature in the range from 50° C. to 175° C., more desirably 135° C. to 150° C. Pressure conditions similar to those of the first stage may be used for the second stage.

The copolymerization is allowed to proceed to a desired stage of completion. According to one approach, the reaction progress can be monitored by evaluating one or more characteristics of the reaction admixture that are a function of the reaction progress. For instance, non-volatile content (NVC) and/or cut viscosity can be monitored until stable.

The copolymerization desirably occurs in the presence of ingredients that facilitate free radical polymerization. For example, one or more initiators serving as a source of free radicals may be incorporated into the reaction admixture in accordance with conventional practices now or hereafter developed. Azoalkanes, peroxides, tertiary butyl perbenzoate, tertiary butyl peroxypivalate, and tertiary butyl peroxyisobutyrate are examples of suitable initiators. Corresponding catalysts also may be used. These include peroxide catalysts (e.g., benzoyl peroxide, methyl ethyl ketone peroxide, cumene hydroperoxide, and the like), azoic compounds, peresters, peroxycarbonates, combinations of these and the like. When used, the initiator or catalyst amount may for example be about 0.5 to about 12 wt. %, preferably about 2 to about 10 wt. %, and more preferably 4 to about and 8 wt. % of the reactants used to form Copolymer I.

Optionally, additional solvent may be added to the admixture to help accomplish copolymerization. Exemplary solvents include one or more organic polar solvents. As a matter of convenience, the same water soluble alcohol(s) used to form the monoester may be used as additional solvent at the neutralization stage.

After the copolymerization is complete, all or a portion of the acid (or anhydride) functionality of the resultant Copolymer I optionally may be neutralized in a manner that results in a more neutral pH, e.g., 6 to 8, preferably 6.3 to 7.8, while still preserving dispersing properties of the acid groups. This is accomplished according to one approach by converting the acid groups into salt groups. Neutralization is helpful in order to make the copolymer more water compatible. Neutralization may occur in a variety of ways. According to one approach, the copolymerization admixture is cooled to a suitable temperature. In some modes of practice, the temperature is in a range from ambient temperature to 110° C. One or more materials (e.g., bases) that react with acid groups to form salt groups are added. In preferred embodiments, one or more amines, alkanolamines, or combinations of these are used. These neutralize acid groups and form substituted ammonium groups. It is believed that the advantages of using substituted ammonium result because a portion of the amine evaporates during the curing process, providing additional crosslinkable functionality. In addition, the water sensitivity tends to be lower than if only more stable salts are used.

Optionally, additional solvent may be added to the admixture to help accomplish neutralization. Exemplary solvents include water and/or one or more organic polar solvents. As a matter of convenience, the same water soluble alcohol(s) used to form the monoester may be used as additional solvent at the neutralization stage. Water also is suitable in many embodiments. Additional solvent may be added in stages. For example, some solvent may be added at the time the neutralizing reactant(s) are added and additional solvent may be added after the neutralization has been allowed to occur for some time. If the neutralization occurs above ambient temperature, additional solvent desirably is preheated before being incorporated into the admixture.

After the neutralization, the admixture may be used directly as is to form a coating composition. Alternatively, Copolymer I may be isolated and/or purified from the admixture and then used to form a coating composition.

Coating compositions desirably incorporate a liquid carrier. Because many embodiments of Copolymer I are highly compatible with water, preferred liquid carriers for use in the coating composition are aqueous media comprising water and optionally one or more additional co-solvents. Exemplary co-solvents include polar organic solvents such as water soluble or water dispersible alcohols, polyethers such as polyethylene glycols that are liquid at room temperature or are solids by themselves but fully dissolve and form a single liquid phase with water at room temperature, acetone, methyl ethyl ketone, tetrahydrofuran, glycol ethers, glycol esters, and combinations of these. Preferred co-solvents include water soluble or water dispersible polyethers and/or water soluble or water dispersible alcohols. All or a portion of the same solvent materials present in the reaction admixture used to form Copolymer I may be carried forward and used as all or a portion of the liquid carrier for the coating composition. Waterborne embodiments are particularly preferred, as these provide coating compositions with low VOC characteristics.

The amount of liquid carrier used in the coating composition may vary over a wide range. If too little liquid carrier is used, then the viscosity of the coating composition may be higher than desired, making it more difficult to obtain high quality coatings in some instances. If too much is used, then the appearance of the coating may be unduly compromised and it may be more difficult to build a desired film thickness. Balancing such concerns, illustrative coating compositions include 50 to 70 parts by weight of liquid carrier per 50 to 100 parts by weight of Copolymer I.

Desirably, at least a portion of the liquid carrier of the coating composition is water. In illustrative embodiments, 65 to 95 weight percent of the liquid carrier is water based on the total weight of the liquid carrier. The amount of Copolymer I incorporated into the coating composition may vary over a wide range. As general guidelines, coating compositions may include 20 to 60, preferably 25 to 40, weight percent of Copolymer I based on the total weight of the coating composition. Exemplary dry coatings include 15 to 40, preferably 20 to 30 weight percent of Copolymer I based on the total dry coating weight.

In addition to Copolymer I and the liquid carrier, the coating compositions optionally may include one or more additional ingredients. For example, coating compositions optionally may be formulated using one or more additional polymer materials to further enhance the performance of the coating compositions and/or the resultant coatings. One class of useful polymers are the so-called crosslinking resins, also referred to as polymer curing agents or simply crosslinkers. These polymers typically are branched and multifunctional in a manner effective to crosslink directly or indirectly to other polymeric constituents of the coating composition via complementary functionality to form coatings that cure to form three dimensional networks through a multitude of crosslinked, inter-resin connections.

The choice of particular crosslinker typically depends on factors including the nature of the other constituents of the coating composition, the nature of the substrate to be coated, and the intended uses of the coated substrate. For example, some coating compositions are highly colored (e.g., gold-colored coatings). These coating compositions and corresponding coatings may typically be formulated using crosslinkers that themselves tend to have a yellowish color. In contrast, white coatings are generally formulated using non-yellowing crosslinkers, or only a small amount of a yellowing crosslinker. Clear coatings desirably use crosslinkers that impart little if any color to the resultant, cured coating. Preferred curing agents, coating compositions, and/or corresponding coatings desirably are substantially free of mobile (and preferably free of bound) bisphenol A (BPA) and the diglycidyl ether of bisphenol A (BADGE). In some embodiments, it may be preferable that the curing agents are substantially free of mobile (and preferably free of bound) aromatic glycidyl ether compounds (e.g., BADGE, BFDGE and epoxy novalacs). As used herein, the terminology "substantially free" means that the coating or coating composition includes less than 1000 ppm, preferably less than 700 ppm, more preferably less than 500 ppm, and even more preferably less than 100 ppm of a constituent on a weight basis.

When Copolymer I includes OH curing functionality, any of the well known hydroxyl-reactive crosslinking resins can be used. For example, phenoplast and aminoplast curing agents may be used. Phenoplast resins include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol. Aminoplast resins are the condensation products of aldehydes such as formaldehyde, acetaldehyde, crotonaldehyde, and benzaldehyde with amino or amido group-containing substances such as urea, melamine and benzoguanamine.

Examples of suitable aminoplast crosslinking resins include, without limitation formaldehyde resins and/or their ether derivatives, such as benzoguanamine-formaldehyde resins, melamine-formaldehyde resins, esterified melamine-formaldehyde, and urea-formaldehyde resins. One specific example of a particularly useful crosslinker is the fully alkylated melamine-formaldehyde resin commercially available from Cytec Industries, Inc. under the trade name of CYMEL 303.

Examples of other generally suitable curing agents that are co-reactive with OH functionality comprise the blocked aliphatic, cycloaliphatic or aromatic di-, tri-, or poly-valent isocyanates, such as hexamethylene diisocyanate, cyclohexyl-1,4-diisocyanate, and the like.

The level of curing agent (i.e., crosslinker) to be used will depend on factors including the type of curing agent, the time and temperature of the curing conditions, the molecular weight of the polymer, the nature of co-reactive polymers that will co-crosslink with the crosslinker, and the like. The crosslinker is typically present in an amount of at least 5% by weight (wt. %), preferably at least 10% by weight, and more preferably at least 15% by weight. The crosslinker is typically present in an amount of at most 50% by weight, preferably at most 40% by weight, and more preferably at least 30% by weight. These weight percentages are based upon the total weight of the resin solids in the coating composition.

A coating composition of the present invention may also include one or more other optional polymers. According to one objective, such optional polymers may be included in a coating composition as a filler material. In some embodiments, filler polymers typically are nonreactive with other polymer materials in the coating composition and become entangled or otherwise physically integrated into the resultant cured coatings. Alternatively, such additional filler materials may be polymers, oligomers, or monomers that are reactive with one or more of the other constituents of the coating composition. If selected with complementary functionality, such polymers and/or monomers can be involved in crosslinking.

One or more additional polymers or oligomers (collectively resins) that promote adhesion to metal-containing substrates are optionally included in the coating compositions. These resin additives help to firmly anchor the resultant coatings to the substrate. Advantageously, these additives are highly resistant to water, even when immersed or exposed to high humidity or condensation. Accordingly, the additives are desirable to use in food and beverage applications on the interior and/or exterior of food or beverage packaging articles. Many embodiments of coating compositions include from 0.05 to about 15 parts by weight of one or more adhesion promoting resins per 50 to 100 parts by weight of Copolymer I.

One kind of adhesion promoting additive incorporates epoxy functionality to help provide desired adhesion characteristics. Many conventional epoxy functional resins are based on bisphenol A chemistry. These resins promote adhesion very effectively and may be used in the practice of the present invention. Recently, there has been a desire to avoid using bisphenol A chemistry to promote adhesion of coatings used on food and beverage containers. Accordingly, alternative resin additives have been developed based on chemistry that avoids using bisphenol A. One such chemistry still uses epoxy functionality to help promote adhesion but derives the epoxy functionality from different constituents such as glycidyl(meth)acrylate (GMA). These alternative epoxy functional materials are also quite effective at promoting adhesion and may be used in the practice of the present invention. Resin additives that use alternative epoxy chemistry, such as GMA chemistry, and their use in coating compositions are described, for example, in U.S. Pat. No. 7,189,787 and U.S. Pat. Pub. No. 2010/0178442, each of which is incorporated herein by reference in its entirety for all purposes.

Another resin additive uses an alternative chemistry based upon phosphonic acid or salts or anhydrides thereof. A phosphonic acid moiety or salt thereof generally has the formula

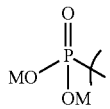

wherein each M independently is a monovalent organic group or a co-member of a ring structure with another M or another moiety in the resin. In many embodiments, the moiety is totally or partly neutralized to form a salt to promote compatibility in water borne compositions. Reacting the acid functionality with an amine or alkanolamine beneficially provides substituted ammonium functionality. Substituted ammonium functionality includes quaternary ammonium functionality. Exemplary Anhydrides of phosphonic acid generally have the formula

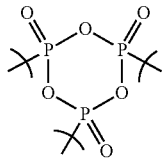

Phosphonic acid functionality and salt and anhydride functionality thereof shall hereinafter be referred to collectively as phosphonate functionality.

Resin additives comprising phosphonate functionality provide excellent adhesion to metal containing substrates. The adhesion characteristics are very stable in the presence of water, making the additives highly useful for coatings used in food and beverage applications. The additives can be made from constituent reactants that are approved for food and beverage contact, so that the additives can be used on the exterior or interior of food and beverage packages such as cans. The additives further can be formulated to be highly compatible with water, so that the additives can be easily used in water borne coating compositions. Additionally, preferred embodiments of these additives are substantially clear and non-yellowing. Accordingly, the additives have minimal if any impact on the color characteristics of the cured coatings. This allows the additives to be used in clear varnishes intended to overly and protect visually discernible indicia that are printed or otherwise provided on package articles.

Consequently, the additives are beneficially incorporated into overprint varnishes of any type, but are particularly advantages in varnishes applied using wet on wet coating techniques. Without wishing to be bound by theory, it is believed that the phosphonate functionality of the applied coating is able to penetrate through an underlying, wet (i.e., uncured or partially cured) printed image and strongly bond to the underlying substrate without disturbing the printed image to any noticeable degree. Additional crosslinking functionality on the additive in the meantime is able to bond to other co-reactive crosslinking functionality on other constituents of the coating to help strongly anchor the coating to the substrate. Strong adhesion is observed even when the additive is in the form of a random copolymer. Apart from the unexpected benefit of being able to promote adhesion through printed indicia, this also is unexpected in that there has been some conventional expectation that anchoring blocks in a block copolymer are needed to provide adequate adhesion. In the practice of the present invention, phosphonate functional additives may be block or random copolymers, but random copolymers are preferred.

Phosphonate functional resins may be selected from one or more different resin types. Examples include polyurethane, polyester, polyether, polycarbonate, (meth)acrylic copolymers, polyamides, polyimides, polyolefins, combinations of these, and the like. Based on balancing factors such as ease of manufacture, cost, abrasion resistance, toughness, abrasion resistance, durability, Tg characteristics, compatibility, ease of solubilizing or dispersing, and the like, (meth)acrylic copolymers are preferred.

Suitable phosphonate functional resins may have number average molecular weights over a wide range. Illustrative embodiments have number average molecular weights in the range from 1000 to 100,000; preferably 2000 to 60,000, even more preferably 2000 to 20,000.

Phosphonate functionality can be easily incorporated into (meth)acrylic copolymers using free radically polymerizable, phosphonate functional reactants that may be monomers, oligomers, and/or polymers. Using monomer reactants is preferred. The phosphonate functional reactants may be copolymerized into the resin backbone and/or integrated into the copolymer via a technique such as grafting, unmasking, chemical modification of other functionality, or the like.

Exemplary free radically polymerizable reactants can be selected from one or more of the following:

N-methacrylamidomethylphosphonic acid ester derivatives, in particular the n-propyl ester (RN 31857-11-1), the methyl ester (RN 31857-12-2), the ethyl ester (RN 31857-13-3), the n-butyl ester (RN 31857-14-4) or the isopropyl ester (RN 51239-00-0), and their phosphonic monoacid and diacid derivatives, such as N-methacrylamidomethylphosphonic diacid (RN 109421-20-7), N-methacrylamidoethylphosphonic acid ester derivatives, such as N-methacrylamidoethylphosphonic acid dimethyl ester (RN 266356-40-5) or N-methacrylamidoethylphosphonic acid di(2-butyl-3,3-dimethyl) ester (RN 266356-45-0), and their phosphonic monoacid and diacid derivatives, such as N-methacrylamidoethylphosphonic diacid (RN 80730-17-2), N-acrylamidomethylphosphonic acid ester derivatives, such as N-acrylamidomethylphosphonic acid dimethyl ester (RN 24610-95-5), N-acrylamidomethylphosphonic acid diethyl ester (RN 24610-96-6) or bis(2-chloropropyl) N-acrylamidomethylphosphonate (RN 50283-36-8), and their phosphonic monoacid and diacid derivatives, such as N-acrylamidomethylphosphonic acid (RN 151752-38-4), the vinylbenzylphosphonate dialkyl ester derivatives, in particular the di(n-propyl) (RN 60181-26-2), di(isopropyl) (RN 159358-34-6), diethyl (RN 726-61-4), dimethyl (RN 266356-24-5), di(2-butyl-3,3-dimethyl) (RN 266356-29-0) and di(t-butyl) (RN 159358-33-5) ester derivatives, and their phosphonic monoacid and diacid alternative forms, such as vinylbenzylphosphonic diacid (RN 53459-43-1), diethyl 2-(4-vinylphenyl)ethanephosphonate (RN 61737-88-0), dialkylphosphonoalkyl acrylate and methacrylate derivatives, such as 2-(acryloyloxy)ethylphosphonic acid dimethyl ester (RN 54731-78-1) and 2-(methacryloyloxy)ethylphosphonic acid dimethyl ester (RN 22432-83-3), 2-(methacryloyloxy)methylphosphonic acid diethyl ester (RN 60161-88-8), 2-(methacryloyloxy) methylphosphonic acid dimethyl ester (RN 63411-25-6), 2-(methacryloyloxy)propylphosphonic acid dimethyl ester (RN 252210-28-9), 2-(acryloyloxy) methylphosphonic acid diisopropyl ester (RN 51238-98-3) or 2-(acryloyloxy)ethylphosphonic acid diethyl ester (RN 20903-86-0), and their phosphonic monoacid and diacid alternative forms, such as 2-(methacryloyloxy)ethylphosphonic acid (RN 80730-17-2), 2-(methacryloyloxy)methylphosphonic acid (RN 87243-97-8), 2-(methacryloyloxy)propylphosphonic acid (RN 252210-30-3), 2-(acryloyloxy)propylphosphonic acid (RN 254103-47-4) and 2-(acryloyloxy)ethylphosphonic acid, vinylphosphonic acid, optionally substituted by cyano, phenyl, ester or acetate groups, vinylidene-phosphonic acid, in the sodium salt form or the form of its isopropyl ester, or bis(2-chloroethyl)vinyl-phosphonate.

Preferred reactants include one or more of vinylphosphonic acid, 2-(methacryloyloxy)ethylphosphonic acid, 2-(acryloyloxy)ethylphosphonic acid, 2-(methacryloyloxy)ethyl phosphate, and 2-(acryloyloxy)ethyl phosphate.

In many embodiments, the additive is formed by copolymerizing at least one free radically polymerizable, phosphonate functional reactant with at least one additional co-polymerizable reactant. The weight ratio of the phosphonate functional reactant(s) to the other reactants generally may be in the range from 1:100 to 100:1, preferably 0.5:100 to 50:100, even more preferably 3:100 to 20:100.

A particularly preferred embodiment of a phosphonate functional resin suitable for use in water borne coatings, with particular utility in overprint varnishes, is a copolymer of reactants comprising:

(a) from 0.5 to 50 weight percent of one or more free radically polymerizable, phosphonate functional reactants. Most preferably, this component comprises vinyl phosphonic acid or a salt or anhydride thereof.

(b) from 20 to 90 weight percent of one or more unsubstituted alkyl(meth)acrylates such as those described above for Copolymer preferably those having C1 to C4 alkyl moieties such as methyl (meth)acrylate, ethyl (meth)acrylate, propyl(meth)acrylate, i-propyl(meth)acrylate, n-butyl (meth)acrylate, t-butyl (meth)acrylate, and/or i-butyl (meth)acrylate. Preferably, this component comprises methyl (meth)acrylate, from 0.5 to 4 parts by weight of n, t, and/or i-butyl (meth)acrylate per 1 to 4 parts by weight of methyl (meth)acrylate, and from 0.5 to 4 parts by weight of ethyl (meth)acrylate per 1 to 4 parts by weight of methyl (meth)acrylate.

(c) from 1 to 40 weight percent of at least one hydroxyl functional (meth)acrylate such as those defined above with respect to Copolymer I. Preferably this component comprises 1-hydroxyethyl (meth)acrylate and/or 2-hydroxy ethyl (meth)acrylate.

(d) from 0.5 to 25 weight percent of a polar group functionalized (meth)acrylate, such as wherein the polar functionality is selected from at least one of carboxylic acid or anhydride thereof, sulfonic acid or anhydride thereof, (meth)acrylonitrile, other acid functionality or anhydride thereof, and/or the like. Exemplary monomers of this type are listed above with respect to Copolymer I. Preferably, this component comprises (meth)acrylic acid.

A variety of different polymer types may be used as the optional additional polymers, singly or in combination. Examples of these include polyesters, (meth)acrylic copolymers or homopolymers, polyimides, polyamides, polycarbonates, polyesters, polyurethanes, novolacs, epoxies, polysulfones, fluoropolymers, polysilicones, polysilanes, polyolefins, polystyrenic polymers, polyethers, combinations and/or copolymers of these, and the like. Preferred optional polymers used as fillers or otherwise are substantially free of mobile (and preferably are free of bound) BPA and aromatic glycidyl ether compounds (e.g., BADGE, BFDGE and epoxy novalacs).

Other optional ingredients may be incorporated into the coating compositions if desired and will be familiar to those skilled in the art. Such optional ingredients are typically included in a coating composition to enhance composition esthetics, to facilitate manufacturing, processing, handling, and application of the composition, and to further improve a particular functional property of a coating composition or a cured coating composition resulting therefrom. Examples of other optional ingredients include include extender fillers, antistatic agents, biocides, fungicides, dispersants, skid resistant agents, agents that protect against ultraviolet exposure, suppressants, surface tension agents, air release agents, initiators, photoinitiators, slip modifiers, thixotropic agents, foaming agents, antifoaming agents, flow or other rheology control agents, waxes, oils, plasticizers, antioxidants, stabilizers, antistatic agents, catalysts, gloss modulating agents, opacifiers, coloring agents including dyes or pigments, pH adjusting agents, visual enhancement aids such as metal flakes, toners, adhesion promoters, dispersants, surfactants, curing promoters such as drying aids, catalysts, or crosslinkers, combinations of these and the like.

One optional ingredient is a catalyst to increase the rate of cure. If used, a catalyst is preferably present in an amount of at least 0.05%, and more preferably at least 0.1%, by weight of nonvolatile material. If used, a catalyst is preferably present in an amount of at most 1%, and more preferably at most 0.5%, by weight of nonvolatile material.

Examples of catalysts, include, but are not limited to, strong acids (e.g., dodecylbenzene sulphonic acid (ddbsa, available as CYCAT 600), methane sulfonic acid (msa), p-toluene sulfonic acid (ptsa), dinonylnaphthalene disulfonic acid (dnndsa), and triflic acid), substituted ammonium compounds, phosphorous compounds, and tin and zinc compounds, like a tetraalkyl ammonium halide, a tetraalkyl or tetraaryl phosphonium iodide or acetate, tin octoate, zinc octoate, triphenylphosphine, and similar catalysts known to persons skilled in the art.

Another useful optional ingredient is a lubricant, such as a wax, which facilitates manufacture of metal closures by imparting lubricity to sheets of coated metal substrate. A lubricant is preferably present in the coating composition in an amount of 0 to 2%, and preferably 0.1 to 2%, by weight of nonvolatile material. Preferred lubricants include, for example, Carnauba wax and polyethylene type lubricants.

Examples of fillers and extenders include talc, silicone dioxide, titanium dioxide, wollastonite, mica, alumina trihydrate, clay, calcium carbonate, magnesium carbonate, barium carbonate, calcium sulfate, magnesium sulfate and barium sulfate.

Surface tension agents may lower surface tension at the surface of an uncured or cured composition, and include silicones such as dimethyl silicones, liquid condensation products of dimethylsilane diol, methyl hydrogen polysiloxanes, liquid condensation products of methyl hydrogen silane diols, dimethylsilicones, aminopropyltriethoxysilane and methyl hydrogen polysiloxanes, and fluorocarbon surfactants such as fluorinated potassium alkyl carboxylates, fluorinated alkyl substituted ammonium iodides, ammonium perfluoroalkyl carboxylates, fluorinated alkyl polyoxyethylene ethanols, fluorinated alkyl alkoxylates, fluorinated alkyl esters, and ammonium perfluoroalkyl sulfonates. Representative commercially available surface tension agents include BYK-306™ silicone surfactant (from BYK-Chemie USA, Inc.), DC100 and DC200 silicone surfactants (from Dow Corning Co.), the MODAFLOW™ series of additives (from Solutia, Inc.) and SF-69 and SF-99 silicone surfactants (from GE Silicones Co.). When employed, the surface tension agent amount may for example be up to about 1 wt. %, or from about 0.01 to about 0.5 wt. % of the coating composition.

Air release agents may assist in curing the coating composition without entrapping air and thereby causing weakness or porosity. Typical air release agents are silicone or non-silicone materials including silicone defoamers, acrylic polymers, hydrophobic solids, and mineral oil based paraffin waxes. Commercially available air release agents include BYK-066, BYK-077, BYK-500, BYK-501, BYK-515, and BYK-555 defoamers (from BYK-Chemie USA, Inc.). When used, the air release agent amount may for example be up to about 1.5 wt. %, up to about 1 wt. %, or from about 0.1 to about 0.5 wt. % of the coating composition.

Coating compositions of the present invention may be made in a variety of ways. According to an illustrative mode of practice, an aqueous solution of Copolymer 1 is prepared. The other resins (if any) are then added one by one, mixing with each addition to obtain a homogeneous admixture. The pH is then adjusted to a suitable value, e.g., 8 to 8.2 in representative embodiments. Dimethylethanolamine (DMEA) is an exemplary material to be used for neutralization. With stirring, one or more waxes (if any) then are added as a predispersion in water and mixed into the admixture until homogeneous. Other additives (if any) are then added one by one with mixing until homogeneous. The resultant composition is further mixed for a suitable time period to help ensure that the composition is homogeneous, e.g., 30 minutes of mixing is suitable in one mode of practice. NVC, viscosity, pH are adjusted as desired.

The coating compositions of the present invention can be used to form protective coating films on a wide range of metal containing substrates. The coating compositions are particularly well suited as coatings on food and beverage packaging articles. The coatings can be coated onto all or a portion of such packages or components thereof. The coatings can be applied onto the packaging articles after the articles are formed, onto components of the articles prior to assembly, or onto stock that is subsequently fabricated into the packaging articles or components thereof. The coatings may be formed on surfaces that are or will be on the interior or exterior of the packaging articles.

The coating compositions can be applied directly or indirectly onto all or a portion of the metal surfaces of a substrate. In some modes of practice, optionally one or more other kinds of coatings or packaging features may be interposed between the coating compositions and the substrate. For example, printed or other visually observable features may be formed on the substrate and then the coating composition is applied onto the features. The coating composition may be applied onto such features after the features are cured. In other modes of practice, the coating composition may be applied using "wet on wet" techniques where the features might still be at least partially wet when the coating composition is applied. In such instances, it is believed that functionality of the coating composition may penetrate through the ink layer(s) to bond via chemical and/or physical adhesion directly to underlying metal surface(s). Coatings applied over printed features are referred to in the industry as overprint varnishes. The coatings of the present invention provide durable, abrasion resistant, water resistant and tough overprint varnishes. Waterborne embodiments have very low VOC content and are environmentally friendly.

Optionally, one or more other kinds of coatings may be applied over the resultant coatings to achieve a variety of performance objectives. For example, stain resistant coatings, oxygen or other barriers, additional printing or labels, ultraviolet protection layers, security indicia, authentication indicia, and/or combinations of these may be used if desired.

The coating compositions are formulated to resist drying prematurely and yet can be easily coated onto substrates and cured to form high quality protective films. Consequently, the coating compositions may be applied to substrates using a wide variety of techniques. Exemplary coating techniques include roller coating, spraying, brushing, spin coating, curtain coating, immersion coating, powder coating, and the like.

After coating, the coating composition is allowed or caused to cure to form a protective film. Heating coated articles can facilitate more rapid curing. Other kinds of curing energy also can be used if desired, depending upon the kind of crosslinking functionality incorporated into the constituents of the coating compositions. The coating composition can be applied one or more times to build up film thickness in stages. In typical embodiments, resultant final coatings of the present invention have a total thickness in the range from 3 $g/m^2$ to 15 $g/m^2$ for illustrative varnish embodiments and 8 $g/m^2$ to 12 $g/m^2$ for pigmented coatings.

In addition to be used as an overprint varnish, the coating compositions are useful for a wide variety of other coating applications in the food and beverage industry. For example, the coating compositions can be formulated from ingredients suitable for food contact situations. Thus, the coating compositions can be used as a barrier coating on the interior of packaging articles such as on the interior of two-piece and three-piece cans. The coatings also may be used for other purposes, including but not limited to wash coating, coil coating, sheet coating, and side seam coating of food and beverage packing.

A wash coating is commercially described as the coating of the exterior of two-piece drawn and ironed ("D&I") cans with a thin layer of protectant coating. The exterior of these D&I cans are 'wash-coated' by passing pre-formed two-piece D&I cans under a curtain of coating. The cans are inverted, that is the open end of the can is in the 'down' position when passing through the curtain. This curtain of coating takes on a 'waterfall-like' appearance. Once these cans pass under this curtain of coating, the liquid coating material effectively coats the exterior of each can. Excess coating is removed through the use of an 'air knife.' Once the desired amount of coating is applied to the exterior of each can, each can is passed through a thermal and/or ultraviolet and/or electromagnetic curing oven to dry and cure the coating. The residence time of the coated can within the confines of the curing oven is 1-5 minutes. The curing temperature within this oven will range between 150-220° C.

A coil coating is described as the coating of a continuous coil composed of a metal (e.g., steel or aluminum). Once coated, the coating coil is subjected to a short thermal, and/or ultraviolet and/or electromagnetic curing cycle, which lead to the drying and curing of the coating. Coil coatings provide coated metal (e.g., steel and/or aluminum) substrates that can be fabricated into formed articles such as 2-piece drawn food cans, 3-piece food cans, food can ends, drawn and ironed cans, beverage can ends and the like.

A sheet coating is described as the coating of separate pieces of a variety of materials (e.g., steel or aluminum) that have been pre-cut into square or rectangular 'sheets'. Typical dimensions of these sheets are approximately one square meters. Once coated, each sheet is cured. Once dried and cured, the sheets of the coated substrate are collected and prepared for subsequent fabrication. Coil coatings provide coated metal (e.g., steel or aluminum) substrate that can be successfully fabricated into formed articles such as 2-piece drawn food cans, 3-piece food cans, food can ends, drawn and ironed cans, beverage can ends and the like.

A side seam coating is described as the spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of liquid coating, which protects the exposed 'weld' from subsequent corrosion or other effects to the contained foodstuff. The liquid or powder coatings that function in this role are termed 'side seam stripes'. Typical side seam stripes are spray applied and cured quickly via residual heat from the welding operation in addition to a small thermal and/or ultraviolet and/or electromagnetic oven.

In some modes of practice, the coating compositions of the present invention are suitable for forming overprint varnish coatings on food and/or beverage packaging, particularly as overprint varnish coatings over printed information applied directly or indirectly onto metal components of such packaging. The printed information can be applied using any suitable technique including but not limited applying onto a packaging component, applying onto a substrate that is later converted into all or a portion of packaging, applied onto a substrate such as paper or the like that is then applied onto all or a portion of the packaging, or the like. The coating composition then may be applied onto all (e.g., flood coating) or a portion (e.g., spot coating) of the information and cured to form a protective coating. It may be clear or tinted and produce a dull, satin, or glossy finish. More than one type of overprint varnish may be used to create special effects.

A wide variety of print layers can be coated with the overprint varnish. Exemplary embodiments of a print layer generally include a binder component including at least one resin (a resin may be an oligomer or a polymer), at least one colorant, and a liquid carrier. The binder component may include one or more thermoplastic and/or thermosetting resins. The liquid carrier may be aqueous or organic or may include a combination of water and organic constituents. Preferred colorants are pigments. Preferred liquid carriers are organic in which water is excluded or limited to 20 weight percent or less, preferably 10 weight percent or less, even more preferably 1 weight percent or less of the liquid carrier based on the total weight of liquid carrier.

When thermosetting resins are used, these may include one or more types of curing functionality. In many embodiments, curing functionality may be cured with aminoplast or amino crosslinking agents. In one embodiment, the binder component includes a polyester resin that includes functionality allowing the polyester to be cured with one or more aminoplast and/or amino crosslinking agents, preferably one or more aminoplast crosslinking agents. In another embodiment, the binder component includes at least one saturated alkyd resin that includes functionality allowing the alkyd resin to be cured with one or more aminoplast and/or amino crosslinking agents, preferably one or more aminoplast crosslinking agents. Preferred binder components comprise at least one polyester resin and at least one saturated alkyd resin, each independently having curing functionality.

In one example, a binder component includes at least one polyester in solution in a fatty alcohol (e.g., C12-C16), wherein the resin is curable via aminoplast crosslinking agent(s); and at least one saturated alkyd resin (preferably short oil length, e.g., under C30) in solution in a fatty alcohol, wherein the resin is curable via amino crosslinking agent(s).

The present invention will now be further described with reference to the following illustrative examples.

EXAMPLE 1

Preparing Embodiments of Copolymer I

Embodiments of Copolymer 1 were made according to the following recipes, wherein the amounts are specified on a weight basis:

| Ingredient | Co-polymer 1A | Co-polymer 1B | Co-polymer 1C | co-polymer 1D | Co-polymer 1E |
|---|---|---|---|---|---|
| 1 Methoxy polyethylene glycol | 0 | 0 | 0 | 137 | 144 |
| 2 Ethyldiglycol | 308 | 331 | 262 | 0 | 0 |
| 3 Maleic anhydride | 68 | 85 | 34 | 27 | 28.2 |
| 4 Ethyldiglycol | 0 | 0 | 0 | 235 | 246.8 |
| 5 Styrene | 140 | 175 | 140 | 111 | 0 |
| 6 Hydroxyl ethyl acrylate | 70 | 70 | 70 | 56 | 58.8 |
| 7 Acrylic acid | 54 | 45 | 111 | 88 | 92.4 |
| 8 Ethyl acrylate | 460 | 426 | 0 | 0 | 58.3 |
| 9 Methyl methacrylate | 460 | 426 | 1000 | 793 | 765 |
| 10 Butyl acrylate | 0 | 0 | 0 | 0 | 126 |
| 11 Perbenzoate t Butyl | 97 | 97 | 110 | 87 | 0 |
| 12 Perbenzoate t Butyl | 27 | 27 | 13 | 17 | 0 |
| 13 Tertio butyl peroxy 2-ethyl hexanoate | 0 | 0 | 0. | 0 | 91.4 |
| 14 Ethyldiglycol | 30 | 20 | 21 | 45 | 21 |
| 15 Polyethylene Glycol | 0 | 0 | 0 | 168 | 176.4 |
| 16 dimethylethanolamine | 96.5 | 96 | 126 | 106 | 111.3 |
| 17 water | 96.5 | 96 | 126 | 106 | 111.3 |
| 18 Water | 2110 | 2110 | 2285 | 1731 | 1965.6 |

To make each Copolymer I sample, Components 1 to 3 are put in a glass vessel equipped with a stirrer and total condenser. The ingredients are protected under nitrogen and heated to 140° C. to 145° C. This temperature is maintained until the acid value is stable. After cooling of the product, component 4 is added under agitation. The product is homogenized under agitation for 15 minutes Next, a mixture of components 5 to 10 is added over 3 hours to the glass vessel while maintaining the temperature at 140-145° C. In parallel, Components 10 and 13 are added over the same period of time to the glass vessel. Holding the temperature at 140° C. to 145° C., components 12 and Component 14 are then added. The temperature is maintained at 140° C. to 145° C. until NVC and cut viscosity are stable.

Then, the contents of the glass vessel are cooled to 100° C., and component 15 is added under agitation. After 15 minutes of homogenization, a mixture of Components 17 and 16 is added over 10 minutes with mixing. The resultant contents are further mixed for 30 minutes. Then, Component 18 (preheated water at 60° C. to 70° C.) is added.

The properties of the Copolymer 1 embodiments are listed in the following table:

|  | NVC (1 g - 30 mn - 180° C.) | In process Viscosity | Final viscosity |
| --- | --- | --- | --- |
| Copolymer 1A | 44% | 90 P 25° C. 60% in Butylglycol | |
| Copolymer 1B | 33.60% | 24 P 25° C. 60% in Butylglycol | 56 sec NF4 25° C. |
| Copolymer 1C | 33.60% | 17 P 25° C. 50% in Butylglycol | 360 sec NF4 25° C. |
| Copolymer 1D |  | 12 P - 25° C. 50% in Butylglycol | |
| Copolymer 1E | 33% | 10 P 50% in Butylglycol at 25° C. | 48 P 25° C. |

EXAMPLE 2

Preparation of Phosphonate Functional Resin

A phosphonate functional resin (Copolymer P) is prepared from the following ingredients:

| 1 | Ethyldiglycol | 2092 |
| --- | --- | --- |
| 2 | Methyl methacrylate | 1453 |
| 3 | Butyl acrylate | 646 |
| 4 | Ethyle acrylate | 491 |
| 5 | Hydroxyethyl acrylate | 282 |
| 6 | Methacrylic acid | 292 |
| 7 | Vinyl phosphonic acid | 364 |
| 8 | Vazo 67 | 71 |
| 9 | Ethyldiglycol | 282 |
| 10 | Trigonox 21 | 12 |
| 11 | Trigonox 21 | 12 |

Ethyldiglycol (component 1) is placed into a glass vessel equipped with a stirrer and total condenser. The contents of the glass vessel are protected under nitrogen heat to 140° C. to 145° C.

A mixture of components 2 to 7 is added over 3 hours to the glass vessel while maintaining the temperature at 140° C. to 145° C. In parallel over the same period of time, a mixture of Components 8 and 9 is added to the glass vessel. The temperature is held at 140° C. to 145° C. for 30 minutes after which Component 10 is added. The temperature is held at 140° C. to 145° C. for 30 minutes and then component 11 is added. The temperature is maintained at 140° C. to 145° C. until NVC (1 g, 1H, 180° C.) and viscosity are stable at NVC=62-64 and viscosity at 140-150 P @ 25° C. The resin is cooled, filtered, and transferred into a can.

EXAMPLE 3

Coating Composition

Exemplary coating compositions (Varnish 1 and 2) are prepared from the following recipe:

|  |  | Varnish 1 | Varnish 2 | Varnish 3 | Varnish 4 |
| --- | --- | --- | --- | --- | --- |
| 1 | Copolymer 1C | 66.72 | 68 | 64.8 | |
| 1a | Copolymer 1E |  |  |  | 64.8 |
| 2 | water | 2 |  |  | |
| 3 | Copolymer P* | 0.88 | 0.92 | 1.19 | 1.19 |
| 4 | Water | 10.57 | 9.12 | 3.05 | 3.05 |
| 5 | Polyethylene glycol | 3.31 | 3.6 | 0 | 0 |
| 6 | Amino resin | 11.11 | 11.36 | 11.09 | 11.09 |
| 7 | Additives | 0.1 | 0.04 | 0.1 | 0.1 |
| 8 | Additives | 1.16 | 1.1 | 1.21 | 1.21 |
| 9 | Nacure 155 | 0.24 | 0.1 | 0.25 | 0.25 |
| 10 | DMEA | 0.32 | 0.58 | 0.02 | 0.02 |
| 11 | Wax dispersion | 1.28 | 2.88 | 1.27 | 1.27 |
| 11a | Water |  |  | 3.64 | 3.64 |
| 12 | Wax paste 1074 | 2.32 | 2.3 | 2.32 | 2.32 |
| 13 | DMEA |  |  | 0.14 | 0.14 |
|  | Viscosity NF4 25° C. | 57 | 52 | 69 | 68 |
|  | NVC (ASTM 60 min 110° C.) | 39.9 | 40 | 38.7 | 37.2 |
|  | Calculated VOC | 210 | 179 | | |

2 g of water (#2, if any) is added to Copolymer 1C or 1E, as the case may be, with stirring. After 5 minutes Copolymer P is added. Then ingredients 4 to 9 are added under stirring in sequence. Components 10, 11, 11A are added as a homogenous premixture After addition of component 12, The pH is adjusted to 8 to 8.2 with component 13 and the reaction admixture is mixed until homogeneous. During minimum 30 minutes. NVC, viscosity, pH are checked and adjusted if desired.

EXAMPLE 4

Coatings

Varnishes 1 and 2 as well as a conventional varnish (Standard) are applied wet on wet with a manual coater at a film weight of 70 mg/33 cl (mg per centiliter) can (3 g/m$^2$) on aluminium cans preinked with re-varnishable inks and cured 30 sec at 180-190° C. PMT. Properties of the coatings are reported in the following table using the following test methods:

Reactivity test (MEK DR): This is a method to determine crosslinking degree of the coating. A piece of cloth is soaked with Methyl Ethyl Ketone (MEK) and used to rub the cured coating previously applied and dried on aluminum flat sheet or aluminum cans. The reactivity will be quantified in number of Double Rubs (DR) applied on the coating to achieve the complete wear of the coating until the substrate is exposed.

Cure Degradation test: This method tests coating behavior to curing conditions. Some coatings can show good cure after heating in a decorator oven but can show cure degradation after heating inside a spray oven. This cure degradation is measured in number of MEK Double Rubs for a coating applied over ink following the same method as the reactivity test described above.

Reverse cure test: This tests coating resistance in the presence, of water vapour. The coating is applied on flat panels over ink and cured. The flat panels will be then introduced in a 2 dm³ oven box containing 0.2 g of water and cured in the oven (3 minutes 30 seconds at 200° C.) until the coating shows a desired chemical resistance to MEK double rubs. The MEK evaluation is repeated until MEK Double Rubs (DR) are stable. The results will be expressed in number of double rubs (DR) after each pass into the oven.

Altek cof: The Altek cof is a friction coefficient which indicates the level of slip for the coating. It is measured using Twing Albert FP 22-50 equipment at 2 different speeds: 5 Inch/minute (12.7 cm/minute) and 20 Inch/minute (50.8 cm/minute). The coating is applied on flat aluminum panels or cans and cured. The panels will then be put onto the equipment using a 2 kg trolley for the measurement.

Pasteurisation tests: This test simulates can pasteurization. The test evaluates coating adhesion to the substrate and film aspect after pasteurization in different conditions.
  Joy test: Coated panels are submerged 15 minutes at 82° C. in a solution of Joy brand detergent prepared at 1% in Deionized water.
  Stella test: Coated panels are submerged 30 minutes at 82° C. in a solution of Disodium Hydrogen Phosphate prepared at 0.5% in Deionized water.
  Carlsberg test: Coated panels are submerged 30 minutes at 82° C. in a solution of Sodium Sulfate prepared at 0.3% in Deionized water.
  DTrol test: Coated panels are submerged 30 minutes at 82° C. in a solution of D-Trol material (Trade name for sterilizing agent-fungicide) prepared at 0.05% in tap water.

All coatings are cross-hatched before introduced to the pasteurization bath. Adhesion is measured after pasteurization above using 3M tape 610-1PK. Tape is applied on the gridded part then removed. Results will be quantified as follow:

GT0 no loss of adhesion

GT1 5% of the coating are removed on the surface gridded

GT2 15% of the coating are removed on the surface gridded

GT3 35% of the coating are removed on the surface gridded

GT4 65% of the coating are removed on the surface gridded

GT5 more than 65% of the coating are removed on the surface gridded

In the following table, the following terminology also is used:

|  | Varnish 1 | Varnish 2 | Standard | Varnish 3 | Varnish 4 |
|---|---|---|---|---|---|
| Reactivity (MEK DR): | | | | | |
| 30" at 170° C. (<166° C. PMT) | 39 | 3 | 100 | 9AR | 15AR |
| 30" 180° C. (171° C. PMT) | 100 | 14 | 100 | >100AR | >100AR |
| 30" 190° C. (182° C. PMT) | 100 | 100 | 100 | >100AR | >100AR |
| 30" 200° C. (193°) | 100 | >100 | 100 | >100AR | >100AR |
| Cure degradation (Can + Red ink) (MEK DR) | | | | | |
| 2 IBO | 100 | / | 100 | >100AR | >100AR |
| 3 IBO | 100 | / | 100 | >100AR | >100AR |
| 10' 200° C. | 100 | / | 100 | >100AR | >100AR |
| 10' 200° C. | 100 | / | 35 | >100AR | >100AR |
| Reverse cure (Can + Red ink)- MEK DR | | | | | |
| 1 IBO | 50 | / | 20 | >100AR | >100AR |
| 2 IBO | 60 | / | 16 | >100AR | >100AR |
| 3 IBO | 70 | / | 20 | 70AR | >100AR |
| 4 IBO | 100 | / | 15 | 90AR | >100AR |
| ALTEK cof | | | | | |
| Speed 5 | 0.072 | / | 0.071 | 0.064 | 0.08 |
| Speed 20 | 0.08 | / | 0.08 | 0.07 | 0.08 |
| ALTEK CONTACT cof | | | | | |
| Speed 20 | 0.102 | / | 0.106 | 0.1 | 0.1 |
| Pasteurisation on cans application with Red ink | | | | | |
| Joy Solution 15' 82° C. | GT0 | GT0 | GT0 | GT0 | GT0 |
| Stella solution 0.5% 30' 82° C. | GT0 | GT0 | GT0 | GT1 | GT2 |
| Carlsberg solution 30' 82° C. | GT0 | GT0 | GT0 | GT0 | GT0 |
| D Trol solution 30' 82° C. | GT0 | GT0 | GT0 | GT0 | GT0 |
| Abrasion test (Gavarti) (Average C (½ inch and above of failure) after | | | | | |
| 30' | 1 | / | 0 | / | / |
| 40' | 1.5 | / | 3 | / | / |
| 50' | 3.5 | / | 4.5 | / | / |

PMT = peak metal temperature (=maximum temperature of the substrate)
DR = double rubs
C = Centigrade
IBO = after curing of the internal For each evaluation, a ink test pattern is printed onto an aluminum surface. The coating is applied on the pre-printed aluminium surface as an overprint varnish, wet on wet (i.e., the ink has not been cured or in other modes has not been fully cured). The data show that the reactivity at very low temperature (166° C.) is slightly worse than standard but is comparable at standard temperature (171° C.). The reverse cure (opposite reaction of curing) of the standard is significantly worse. The standard varnish is a commercial, water-based varnish based on polyester. Better reverse cure is a significant advantage. This means that curing occurs with less degradation of coating components.

All patents, patent applications, and publications cited herein are incorporated by reference as if individually incorporated. Unless otherwise indicated, all parts and percentages are by weight and all molecular weights are number average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of making a coated, food and/or beverage container or portion thereof, said method comprising the steps of:
   a) providing a coating composition derived from one or more ingredients comprising at least one copolymer that comprises Repeating Unit A of the formula:

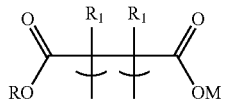

wherein:
   1) R is a hydrophilic moiety comprising C and one or more heteroatoms, that has a molecular weight of at least 59 g/mol, an average ratio of C atoms to heteroatoms of 3.5 or less, and that is a residue of a water soluble or water dispersible alcohol; and
   2) each $R_1$ independently is H, a co-member of a ring structure, or a monovalent aromatic and/or aliphatic moiety; and
   3) M is H or a cation; and
   b) coating the coating composition on a metal containing food and/or beverage container or portion thereof to form a coated, metal containing food and/or beverage container or portion thereof.

2. The method of claim 1, wherein at least one $R_1$ comprises H.

3. The method of claim 1, wherein M is H.

4. The method of claim 1, wherein M comprises a monovalent cation.

5. The method of claim 4, wherein M comprises a substituted ammonium moiety.

6. The method of claim 1, wherein the alcohol has a ratio of C to O of less than 3.2.

7. The method of claim 6, wherein the alcohol comprises ethyldiglycol.

8. The method of claim 6, wherein the alcohol is selected from butylglycol, methoxy propylene glycol, and/or polyalkylene glycol or any derivatives of one or more of these bearing one hydroxyl group on average.

9. The method of claim 1, wherein the alcohol has a ratio of C to O of less than 2.5.

10. The method of claim 1, wherein R has an atomic weight of at least 100 g/mol and less than 3000 g/mol.

11. The method of claim 1, wherein the alcohol has a molecular weight of at least 100 g/mol and less than 3000 g/mol.

12. The method of claim 1, wherein the repeating unit A is derived from ingredients comprising a primary alcohol and a diacid and/or an anhydride of a diacid.

13. The method of claim 12, wherein the diacid or anhydride is selected from one or more of maleic acid, fumaric acid, maleic anhydride, 4-cyclohexene-1,2-dicarboxylic acid or anhydride, itaconic acid, nadic anhydride, and/or methyl nadic anhydride.

14. The method of claim 1, wherein the coating composition further comprises a phosphonate functional resin and at least one additional resin selected from an aminoplast resin and/or a phenoplast resin.

15. The method of claim 1, wherein in addition to said Repeating Units A, the copolymer further comprises 50 to 100 parts by weight of one or more Repeating Units B per 0.1 to 50 parts by weight of said repeating units.

16. The method of claim 15, wherein the one or more additional Repeating Units B are derived from reactants that comprise (1) from 10 to 300 parts by weight of a substituted or unsubstituted, aromatic, free radically polymerizable monomer; (2) from 20 to 1000 parts by weight of at least one C1 to C3 alkyl (meth)acrylate; (3) from 10 to 200 parts by weight of at least one hydroxyl functional free radically polymerizable monomer and (4) from 5 to 200 parts by weight of at least one polar group functional, water soluble free radically polymerizable monomer; wherein the recited parts by weight of these Repeating Units B constituents are per 100 to 500 parts by weight of the total amount of Repeating Unit(s) A.

17. The method of claim 1 wherein
   R forms a cyclic group with other moieties of the repeating unit or of the copolymer.

* * * * *